(12) United States Patent
Li et al.

(10) Patent No.: US 12,194,642 B2
(45) Date of Patent: Jan. 14, 2025

(54) KINEMATICS CALIBRATION METHOD AND CALIBRATION SYSTEM FOR ROBOT WITH MULTIPLE DEGREES OF FREEDOM

(71) Applicants: FOSHAN FLEXIV ROBOTICS TECHNOLOGY CO, . LTD., Foshan (CN); FLEXIV LTD., Grand Cayman (KY)

(72) Inventors: Xuesen Li, Santa Clara, CA (US); Kenneth Chao, Santa Clara, CA (US); Yakun Ma, Santa Clara, CA (US); Hao Jiang, Santa Clara, CA (US); Peizhang Zhu, Santa Clara, CA (US); Mengshen Wu, Santa Clara, CA (US); Maozhi Liu, Santa Clara, CA (US); Shuyun Chung, Santa Clara, CA (US); Xiyang Yeh, Santa Clara, CA (US); Shiquan Wang, Santa Clara, CA (US)

(73) Assignees: FOSHAN FLEXIV ROBOTICS TECHNOLOGY CO, . LTD., Foshan (CN); FLEXIV LTD., Grand Cayman (GB)

( * ) Notice: Subject to any disclaimer, the term of this patent is extended or adjusted under 35 U.S.C. 154(b) by 0 days.

(21) Appl. No.: 17/617,677

(22) PCT Filed: Nov. 5, 2021

(86) PCT No.: PCT/CN2021/128953
§ 371 (c)(1),
(2) Date: Dec. 9, 2021

(87) PCT Pub. No.: WO2023/077415
PCT Pub. Date: May 11, 2023

(65) Prior Publication Data
US 2024/0009848 A1    Jan. 11, 2024

(51) Int. Cl.
*B25J 9/16* (2006.01)

(52) U.S. Cl.
CPC .......... *B25J 9/1692* (2013.01); *B25J 9/1653* (2013.01); *B25J 9/1664* (2013.01)

(58) Field of Classification Search
CPC ....... B25J 9/1692; B25J 9/1653; B25J 9/1664
See application file for complete search history.

(56) References Cited

U.S. PATENT DOCUMENTS

| 4,552,502 A | 11/1985 | Harjar |
| 11,999,065 B2 * | 6/2024 | You .................. G16H 20/40 |

(Continued)

FOREIGN PATENT DOCUMENTS

| CN | 102026783 A | 4/2011 |
| CN | 104655167 A | 5/2015 |

(Continued)

OTHER PUBLICATIONS

International Search Report for International Application No. PCT/CN2021/128953 mailed Oct. 26, 2022.

(Continued)

*Primary Examiner* — Sohana Tanju Khayer
(74) *Attorney, Agent, or Firm* — Dorsey & Whitney LLP

(57) ABSTRACT

The present disclosure relates to a kinematics calibration method for a robot with multiple degrees of freedom. The robot includes a base, an end effector, and a plurality of links connected by joints. The method includes locking part of the multiple degrees of freedom by limiting the base and the end effector impose a limitation of degree of freedom; moving the robot to perform a first movement and accordingly obtaining a first set of data associated with joint angles and a first actual motion of the end effector; calculating a first theoretical motion of the end effector based on the first set of data and initial kinematics parameters; and updating the (Continued)

initial kinematics parameters of the robot to obtain a first set of updated kinematics parameters based on the first theoretical motion and the first actual motion.

21 Claims, 3 Drawing Sheets

(56) References Cited

U.S. PATENT DOCUMENTS

| | | | | |
|---|---|---|---|---|
| 2003/0167103 | A1* | 9/2003 | Tang | B25J 9/1692 |
| | | | | 700/254 |
| 2007/0073442 | A1* | 3/2007 | Aghili | B25J 9/1605 |
| | | | | 700/245 |
| 2010/0122602 | A1* | 5/2010 | Marcroft | B25J 17/0216 |
| | | | | 901/18 |
| 2014/0343727 | A1* | 11/2014 | Calkins | B25J 9/1692 |
| | | | | 700/254 |
| 2017/0066131 | A1* | 3/2017 | Kamikawa | B25J 9/1697 |
| 2018/0050452 | A1* | 2/2018 | Ou | B25J 9/1697 |
| 2018/0126553 | A1* | 5/2018 | Corkum | B25J 9/1697 |
| 2020/0298403 | A1* | 9/2020 | Nilsson | B25J 9/1692 |
| 2021/0260770 | A1* | 8/2021 | Vu | B25J 9/1697 |
| 2022/0250237 | A1* | 8/2022 | Nagashima | B25J 9/1664 |
| 2022/0390545 | A1* | 12/2022 | Yasini | G01S 5/0294 |
| 2022/0411024 | A1* | 12/2022 | Browne | B63B 21/00 |
| 2023/0044898 | A1* | 2/2023 | Zhang | G09B 19/003 |
| 2023/0126611 | A1* | 4/2023 | Itotani | A61B 90/25 |
| | | | | 606/130 |
| 2024/0042593 | A1* | 2/2024 | Huang | A61B 90/50 |

FOREIGN PATENT DOCUMENTS

| | | | |
|---|---|---|---|
| CN | 106625594 | A | 5/2017 |
| CN | 107309884 | A | 11/2017 |
| CN | 108524001 | A | 9/2018 |
| CN | 109773781 | A | 5/2019 |
| CN | 112692828 | A * | 4/2021 |
| CN | 112847341 | A | 5/2021 |
| JP | 2012101306 | A | 5/2012 |
| WO | 2019100627 | A1 | 5/2019 |

OTHER PUBLICATIONS

First Office Action dated Oct. 26, 2022 for Chinese Application No. 202111305545.X.

* cited by examiner

KINEMATICS CALIBRATION METHOD AND CALIBRATION SYSTEM FOR ROBOT WITH MULTIPLE DEGREES OF FREEDOM

CROSS-REFERENCE TO RELATED APPLICATIONS

This application is a U.S. National Stage of International Application No. PCT/CN2021/128953, filed Nov. 5, 2021, the contents of which are incorporated herein by reference in its entirety.

TECHNICAL FIELD

The present disclosure relates to the field of robotics, and in particular to a kinematics calibration method and calibration system for a robot with multiple degrees of freedom.

BACKGROUND

To achieve flexible operation of a robot, multiple degrees of freedom of motion are often given to robots. For example, a manipulator with six degrees of freedom can be realized by six joints, each joint connecting two adjacent robot links. In this way, the position and orientation of an end effector located at the end, such as a gripper, can be freely adjusted in a certain three-dimensional space by a proper joint configuration.

kinematics calibration must be done for a robot before working to ensure that the robot's motions are accurate. Kinematics calibration is the process of identifying certain parameters in the kinematics structure of the robot, such as those associated with the relative position and orientation of the robot's links. A kinematics calibration method known to the applicant for robots requires the use of external sensors, such as laser trackers, dial gauges or pull-string devices, to measure the motion of the robot, and the measurement results are used to estimate the kinematics properties of the robot. These external sensors bring in additional measurement errors, setup complexity and high costs to the calibration process.

SUMMARY

The present disclosure provides an improved kinematics calibration method and calibration system for a robot with multiple degrees of freedom to solve at least one technical problem in the prior art.

According to one aspect of the present disclosure, a kinematics calibration method for a robot with multiple degrees of freedom is provided. The robot includes a base, an end effector, and a plurality of links connected by joints. The method including: locking part of the multiple degrees of freedom by limiting the base and the end effector impose a limitation of degree of freedom; moving the robot to perform a first movement and accordingly obtaining a first set of data associated with joint angles and a first actual motion of the end effector; calculating a first theoretical motion of the end effector based on the first set of data and initial kinematics parameters; and updating the initial kinematics parameters of the robot to obtain a first set of updated kinematics parameters based on the first theoretical motion and the first actual motion.

According to another aspect of the present disclosure, a kinematics calibration system for a robot with multiple degrees of freedom is provided. The robot includes a base, an end effector, and a plurality of links connected by joints. Part of the multiple degrees of freedom of the robot are locked by limiting the base and the end effector. The kinematics calibration system includes a control system for kinematically calibrating the robot, and the control system is configured to: calculate a first theoretical motion of the end effector based on a first set of data associated with joint angles due to a first movement of the robot and initial kinematics parameters; and update the initial kinematics parameters of the robot to obtain a first set of updated kinematics parameters based on the first theoretical motion and a first actual motion due to the first movement of the robot.

These and other objects, advantages, purposes and features will become apparent upon review of the following specification in conjunction with the drawings.

BRIEF DESCRIPTION OF THE DRAWINGS

These and other features of the present disclosure will be more readily understood by the following detailed description of various aspects of the present disclosure in conjunction with the accompanying drawings describing various embodiments of the present disclosure, in which.

DETAILED DESCRIPTION

In order to make the above-mentioned objects, features and advantages of the present disclosure more obvious and understandable, the specific embodiments of the present disclosure are described in detail below in conjunction with the accompanying drawings. In the following description, many specific details are set forth to facilitate a full understanding of the disclosure. However, the disclosure can be implemented in many other ways than those described herein, and the person skilled in the art can make similar improvements without departing from the concept of the disclosure, so that the disclosure is not limited by the specific embodiments disclosed below.

In the present disclosure, unless otherwise expressly specified and limited, terms such as "mounting", "connecting", "connected", "fixed", "disposed" and other terms should be understood in a broad sense. For example, unless otherwise expressly qualified, "connection" can be a fixed connection, or removable connection, or in one piece. It may mean a direct connection, an indirect connection through an intermediate element, or an internal connection of two components or the interaction between two components. For example, when the element is described to be "fixed" or "disposed" to another element, it can be directly on the other element or there may be an intermediate element. For those of ordinary skill in the art, the specific meaning of the above terms in the context of the present disclosure can be understood on a case-by-case basis.

The present disclosure provides a kinematics calibration method for a robot with multiple degrees of freedom. The robot includes a base, an end effector, and a plurality of links connected by joints. The method includes: locking part of the multiple degrees of freedom by limiting the base and the end effector impose a limitation of degree of freedom;

moving the robot to perform a first movement and accordingly obtaining a first set of data associated with joint angles and a first actual motion of the end effector; calculating a first theoretical motion of the end effector based on the first set of data and initial kinematics parameters; and updating the initial kinematics parameters of the robot to obtain a first set of updated kinematics parameters based on the first theoretical motion and the first actual motion.

Figure 1:
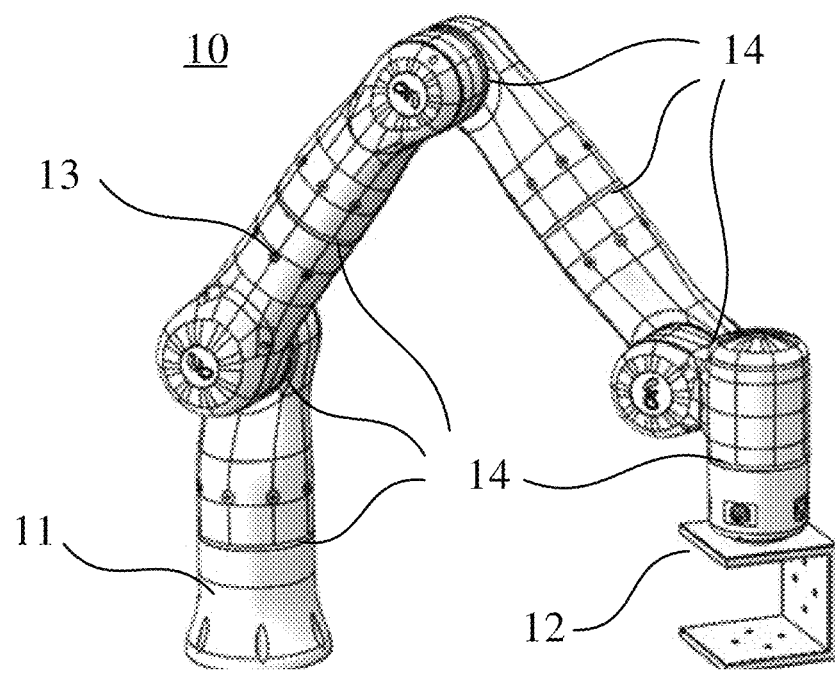
FIG. 1 is a schematic diagram of a robot according to an embodiment of the present disclosure.

In an embodiment, as shown in FIG. 1, the robot 10 includes a base 11 at one end, an end effector 12 at the other end, a plurality of links 13, and joints 14 connecting the adjacent base 11, the links 13, and the end effector 12. The end effector 12 may include various forms, such as a gripper. In this embodiment, since the robot 10 is a seven-axis robot with seven degrees of freedom by seven joints, and thus constitutes a redundant robot that can perform operations in a three-dimensional Cartesian coordinate system space.

Figure 2:
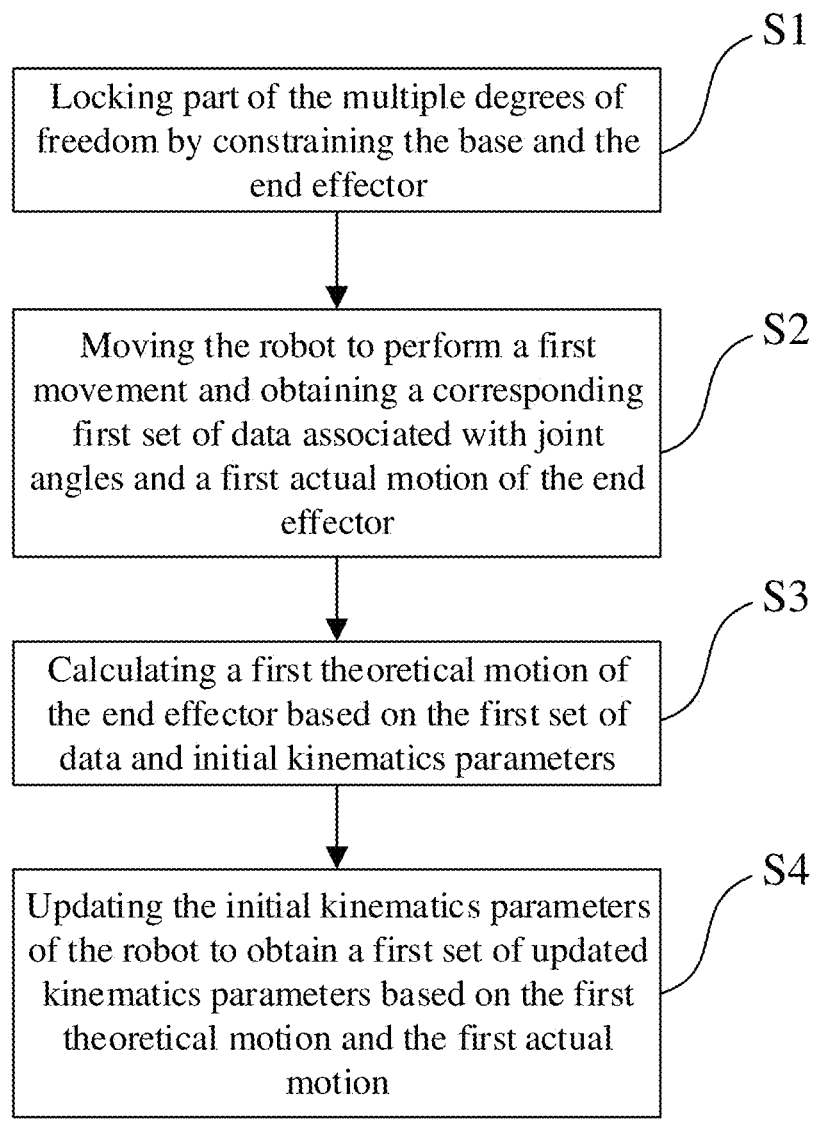
FIG. 2 is a flowchart of a kinematics calibration method for a robot according to an embodiment of the present disclosure.

Referring to FIG. 2, according to some embodiments of the present disclosure, a kinematics calibration method for a robot includes:

S1: locking part of the multiple degrees of freedom by limiting the base and the end effector impose a limitation of degree of freedom.

In an embodiment, the robot is assumed to be an n-axis robot with n degrees of freedom, where n is a natural number greater than or equal to 2. Locking part of the multiple of degrees of freedom includes locking n−1 degrees of freedom, thereby enabling the robot to move to perform a null-space motion. Null-space motion means that other parts of the robot, such as links and joints, move without the end effector moving. In the case of a robot 10 with seven degrees of freedom, for example, locking of the base 11 and the end effector 12 can lock six degrees of freedom, leaving one degree of freedom available for the robot 10 to perform null-space motion. In some embodiments, locking of the base 11 and end effector 12 can be achieved by securing them to the same or different fixtures.

In other embodiments, the locked degrees of freedom can be reduced by other means of limiting the base 11 and end effector 12. For example, the end effector 12 is allowed to move in a plurality of directions, thereby giving the robot 10 more degrees of freedom for movement during calibration. The number of multiple directions here is less than the number of degrees of freedom of the robot 10.

For example, in an embodiment, the end effector 12 is configured to move in a fixed linear direction along a linear track. In this case, there is an additional degree of freedom available for the robot 10 to move, compared to the case where the end effector is fixed. For example, for a robot 10 with seven degrees of freedom, two degrees of freedom may be left available for the robot 10 to move.

In another embodiment, the end effector 12 is configured to rotate about an axis of a bearing. In this case, there is also an additional degree of freedom available for the robot 10 to move, compared to the case where the end effector is fixed. In the case of a robot 10 with seven degrees of freedom, for example, two degrees of freedom are also left available for the robot 10 to move.

In another embodiment, the end effector 12 is configured to move in a plane. This leaves two more degrees of freedom for the robot 10 to move than if the end effector were fixed. For example, for a robot 10 with seven degrees of freedom, three degrees of freedom are left available for the robot 10 to move.

In another embodiment, the end effector 12 is configured to rotate about the center of a ball joint. This leaves three more degrees of freedom available for robot motion than if the end effector were fixed. For example, for a robot 10 with seven degrees of freedom, four degrees of freedom are left available for robot motion.

S2: moving the robot to perform a first movement and accordingly obtaining a first set of data associated with joint angles and a first actual motion of the end effector.

For example, for a robot 10 with seven degrees of freedom, locking its base 11 to the end effector 12 would enable the robot 10 to perform null-space motion. In this case, the first motion is a first null-space motion, and the first actual motion is actually a zero motion, i.e., the end effector does not actually move because it is fixed.

In the embodiment where the end effector 12 is not fully fixed, the first actual motion includes the motion of the end effector 12 in each degree of freedom, such as rotation angle, direction of motion, stroke of motion.

In an embodiment, the robot 10 may be controlled to perform the first movement, such as controlling the movement of the joints 14 to control the robot 10 to perform the first movement based on instructions. In another embodiment, the robot 10 may be caused to move by an external force to perform the first movement. For example, the robot 10 is actuated to move by human power to perform the first movement. The first movement can be a predetermined movement or a relatively random movement, both of which can implement the process of collecting data for parameter calibration as will be described later.

In an embodiment, all joints 14 of the robot 10 can be made to move to make a change to joint angle. In other embodiments, for example, where the robot 10 is left with more than one degrees of freedom available for motion, only some of the joints 14 may be made to move.

The first set of data associated with joint angles can be either direct joint angle data or indirect data indicative of the joint angles. Based on these angle data it is possible to calculate at the same time the movement of each link 13 connected to the joint 14, for example the posture of the link 13 after the movement. Thus, the first set of data can be used for the calibration of the kinematics parameters, which will be described later.

S3: calculating a first theoretical motion of the end effector based on the first set of data and initial kinematics parameters.

The theoretical motion is referred to the motion that the end effector should theoretically be able to achieve according to the initial kinematics parameters. The motion of the end effector can be calculated based on the joint angle data and the initial kinematics parameters. The initial kinematics parameters can be either the data set at the factory or calibrated data by a previous calibration. In practice, the theoretical motion calculated from the initial kinematics parameters does not correspond to the actual motion due to various errors, such as changes in parameters due to wear and tear of parts.

In an embodiment, a forward kinematics method is used to calculate the first theoretical motion of the end effector 12, and specifically, the theoretical motion of the end effector 12 is calculated using a forward kinematics equation based on joint parameters. The forward kinematics method itself is prior art in the field and is not otherwise detailed herein in the present disclosure.

S4: updating the initial kinematics parameters of the robot to obtain a first set of updated kinematics parameters based on the first theoretical motion and the first actual motion.

As described earlier, there may be inconsistency between the theoretical motion calculated based on the initial kinematics parameters and the actual motion, so the kinematics parameters of the robot 10 need to be recalibrated so that the motion calculated by forward kinematics is consistent with the actual motion. In this way, the posture of the end effector 12, including orientation and position, can be derived from the joint data, or required joint motion data can be calculated in reverse based on an expected posture of the end effector 12 for controlling the movements of the joints 14.

In an embodiment, the update of the kinematics parameters can be performed by an appropriate algorithm. For example, the Pair-wise distance method is used to converge the calculated values to the actual values and thus obtain the first set of updated kinematics parameters.

In an embodiment, the first set of updated kinematics parameters obtained may be directly used as the calibration kinematics parameters of the robot 10.

In other embodiments, multiple calibrations may be performed and multiple sets of updated kinematics parameters may be obtained, thereby combining these updated kinematics parameters to determine the final calibrated kinematics parameters of the robot 10.

For example, in an embodiment, the calibration method further includes: moving the robot 10 to perform a second movement different from the first movement and accordingly obtaining a second set of data associated with joint angles and a second actual motion of the end effector 12; calculating a second theoretical motion of the end effector 12 based on the second set of data and the initial kinematics parameters; and updating the initial kinematics parameters based on the second theoretical motion and the second actual motion to obtain a second set of updated kinematics parameters.

The above process for obtaining the second set of updated kinematics parameters is similar to the process described previously for obtaining the first set of updated kinematics parameters, with the difference being that the motion of the robot 10 is changed. For example, for null-space motion, the movements of some or all of the joints 14 or links 13 are changed.

By recalibrating the kinematics by changing the motion of the robot 10, the final calibrated kinematics parameters can be determined based on the results of the two calibrations, for example taking the average of the two as the final calibrated kinematics parameters.

In addition, in another embodiment, during the second calibration, the first set of updated kinematics parameters can be recalibrated using a similar process as initial kinematics parameters, thereby obtaining a second set of updated kinematics parameters and taking the second set of updated kinematics parameters as the calibrated kinematics parameters of the robot 10.

In the embodiment in which the base 11 of the robot 10 and the end effector 12 are locked so that the robot 10 can perform null-space motion, the calibration method may further include: moving and locking the end effector 12 to a second position different from the first position; moving the robot 10 to perform a third null-space motion and accordingly obtaining a third set of data related to joint angles and a third actual motion of the end effector 12; calculating a third theoretical motion of the end effector 12 based on the third set of data and the initial kinematics parameters; and updating the initial kinematics parameters to obtain a third set of updated kinematics parameters based on the third theoretical motion and the third actual motion, and determining calibrated kinematics parameters based on the first set of updated kinematics parameters and the third set of updated kinematics parameters.

The above process of obtaining the third set of updated kinematics parameters is similar to the process of obtaining the first set of updated kinematics parameters described previously, with the difference being that the position of the end effector 12 of the robot 10 is changed.

By changing the position of the end effector 12 and performing a new calibration, the final calibrated kinematics parameters can be determined based on the results of both calibrations in a combined manner, for example taking the average of the two as the final calibrated kinematics parameters. In another embodiment, during the second calibration, the first set of updated kinematics parameters can be used as initial kinematics parameters and recalibrated using a similar process to obtain the third set of updated kinematics parameters, and the third set of updated kinematics parameters may be taken as the final calibrated kinematics parameters.

Understandably, it is also possible to combine the aforementioned first set of updated kinematics parameters, the second set of updated kinematics parameters, and the third set of updated kinematics parameters, so as to finalizing the calibrated kinematics parameters. For example, the average of the three sets of parameters is taken as the final calibration kinematics parameters.

It is understood that the above mentioned "second set of updated kinematics parameters" and "third set of updated kinematics parameters" are only name distinctions for descriptive convenience, and there is no logical dependency between the two. For example, the acquisition of the third set of updated kinematics parameters does not depend on the second set of updated kinematics parameters. Obviously, it is also understandable that the acquisition of the third set of updated kinematics parameters can be performed on the basis of the second set of updated kinematics parameters, for example, using the second set of updated kinematics parameters as initial kinematics parameters, changing the position of the end effector 12, and recalibrating to obtain the third set of updated kinematics parameters to obtain the final calibrated kinematics parameters.

Figure 3:
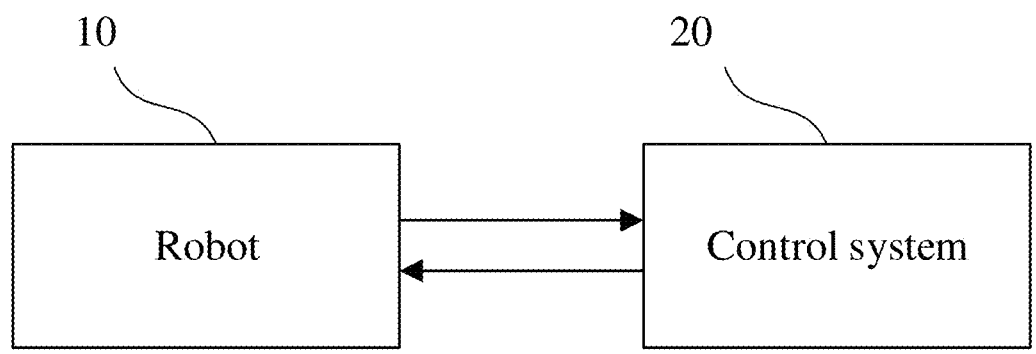
FIG. 3 is a schematic diagram of a kinematics calibration system for a robot according to an embodiment of the present disclosure.

The present disclosure also provides a kinematics calibration system for a robot with multiple degrees of freedom. Referring to FIG. 3, the kinematics calibration system includes a control system 20 for kinematics calibration of the robot 10. The control system 20 may be a variety of computer systems having a processor. It will be appreciated that the control system 20 may be the control system of the robot 10 itself, or it may be a separate system for kinematics calibration. The control system 20 is configured to perform the kinematics calibration methods described in the above embodiments, such as controlling the motions of the robot 10 to perform movements and obtaining the corresponding data associated with joint angles and the motion of the end effector 12; calculating theoretical motions of the end effector 12 based on the data and initial kinematics parameters; and updating the initial kinematics parameters of the robot 10 based on the theoretical motion and an actual motion to obtain updated kinematics parameters. Since the methods of each embodiment have been described in detail above in this disclosure, they will not be described in detail herein.

The kinematics calibration method and calibration system based on the plurality of embodiments of the present disclosure eliminates the need to use a large number of external sensors to obtain parameters for calibration, thereby simplifying the system and process and reducing calibration costs. In addition, the kinematics calibration method and calibration system based on the multiple embodiments of the present disclosure can facilitate multiple calibrations or superimposed calibrations, and thus have better kinematics calibration accuracy and calibration efficiency, while the calibration process has greater flexibility.

The above described embodiments express only several embodiments of the present disclosure, which are described in a more specific and detailed manner, but they should not be understood as a limitation of the patent scope of the disclosure for this reason. It should be noted that for a person of ordinary skill in the art, a number of deformations and improvements can be made without departing from the conception of the present disclosure, which all belong to the scope of protection of the present disclosure. Therefore, the scope of protection of the patent of the present disclosure shall be subject to the attached claims.

What is claimed is:

1. A kinematics calibration method for a robot with multiple degrees of freedom, the robot comprising a base, an end effector, and a plurality of links connected by joints, the kinematics calibration method comprising:
    locking part of the multiple degrees of freedom by limiting the base and the end effector to impose a limitation of degree of freedom;
    moving the robot to perform a first movement and accordingly obtaining a first set of data associated with joint angles and a first actual motion of the end effector;
    calculating a first theoretical motion of the end effector based on the first set of data and initial kinematics parameters; and
    updating the initial kinematics parameters of the robot to obtain a first set of updated kinematics parameters based on the first theoretical motion and the first actual motion;
    wherein the robot comprises an n-axis robot with n degrees of freedom, where n is a natural number greater than or equal to 2; and
    wherein locking part of the multiple degrees of freedom comprises locking n−1 degrees of freedom by fixing the base and the end effector simultaneously, such that the robot is configured to move in its null space, and moving the robot to perform the first movement comprises moving the robot to perform a first null-space motion.

2. The kinematics calibration method of claim 1, wherein the moving the robot to perform the first movement comprises controlling the joint to move the robot to perform the first movement, or moving the robot to perform the first movement by an external force.

3. The kinematics calibration method of claim 1, further comprising:
    moving the robot to perform a second movement in the same null-space as the first movement and accordingly obtaining a second set of data associated with the joint angles and a second actual motion of the end effector, the second movement being different from the first movement;
    calculating a second theoretical motion of the end effector based on the second set of data and the initial kinematics parameters; and
    updating the initial kinematics parameters to obtain a second set of updated kinematics parameters based on the second theoretical motion and the second actual motion, and determining calibrated kinematics parameters based on the first set of updated kinematics parameters and the second set of updated kinematics parameters.

4. The kinematics calibration method of claim 1, further comprising:
    moving the robot to perform a second movement and accordingly obtaining a second set of data associated with the joint angles and a second actual motion of the end effector, the second movement being different from the first movement;
    calculating a second theoretical motion of the end effector based on the second set of data and the first set of updated kinematics parameters; and
    updating the first set of updated kinematics parameters to obtain a second set of updated kinematics parameters based on the second theoretical motion and the second actual motion, the second set of updated kinematics parameters being taken as calibrated kinematics parameters.

5. The kinematics calibration method of claim 1, wherein the moving the robot to perform the first movement comprises changing the angles of all the joints of the robot to perform the first movement.

6. The kinematics calibration method of claim 1, wherein the robot comprises a redundant robot with seven degrees of freedom, the locking n−1 degrees of freedom comprising locking the base and locking the end effector to a first position, thereby locking six degrees of freedom.

7. The kinematics calibration method of claim 6, further comprising:
    moving and locking the end effector to a second position different from the first position;
    moving the robot to perform a third null-space motion and accordingly obtaining a third set of data associated with the joint angles and a third actual motion of the end effector;
    calculating a third theoretical motion of the end effector based on the third set of data and the initial kinematics parameters; and
    updating the initial kinematics parameters to obtain a third set of updated kinematics parameters based on the third theoretical motion and the third actual motion, and determining calibrated kinematics parameters based on the first set of updated kinematics parameters and the third set of updated kinematics parameters.

8. The kinematics calibration method of claim 1, wherein the updating the initial kinematics parameters of the robot to obtain a first set of updated kinematics parameters based on the first theoretical motion and the first actual motion comprises updating the initial kinematics parameters by performing pair-wise distance measurements.

9. The kinematics calibration method of claim 1, wherein the locking part of the multiple degrees of freedom comprises locking the base while allowing movement of the end effector in a plurality of directions, a number of the plurality of directions being less than that of the multiple degrees of freedom.

10. The kinematics calibration method of claim 9, wherein the end effector is configured to move in a fixed linear direction along a linear track.

11. The kinematics calibration method of claim 9, wherein the end effector is configured to rotate about an axis of a bearing.

12. The kinematics calibration method of claim 9, wherein the end effector is configured to move in a plane.

13. The kinematics calibration method of claim 9, wherein the end effector is configured to rotate about a center of the ball joint.

14. A kinematics calibration system for a robot with multiple degrees of freedom, the robot comprising a base, an end effector, and a plurality of links connected by joints, part of the multiple degrees of freedom of the robot being locked by limiting the base and the end effector, wherein the kinematics calibration system comprises a control system for kinematically calibrating the robot, and the control system is configured to:

calculate a first theoretical motion of the end effector based on a first set of data associated with joint angles due to a first movement of the robot and initial kinematics parameters; and update the initial kinematics parameters of the robot to obtain a first set of updated kinematics parameters based on the first theoretical motion and a first actual motion due to the first movement of the robot;

wherein the robot comprises an n-axis robot with n degrees of freedom, where n is a natural number greater than or equal to 2, and n−1 degrees of freedom are locked by fixing the base and the end effector simultaneously, such that the robot is configured to move in its null space, the first movement of robot comprising a first null-space motion.

15. The kinematics calibration system of claim 14, wherein the control system is further configured to perform the first movement.

16. The kinematics calibration system of claim 14, wherein the control system is further configured to:

calculate a second theoretical motion of the end effector based on a second set of data associated with the joint angles due to a second movement in the same null-space as the first movement of the robot and the initial kinematics parameters, the second movement being different from the first movement; and update the initial kinematics parameters to obtain a second set of updated kinematics parameters based on the second theoretical motion and a second actual motion due to the second movement of the robot, and determining calibrated kinematics parameters based on the first set of updated kinematics parameters and the second set of updated kinematics parameters.

17. The kinematics calibration system of claim 14, wherein the control system is further configured to:

calculate a second theoretical motion of the end effector based on a second set of data associated with the joint angles due to a second movement of the robot and the first set of updated kinematics parameters, the second movement being different from the first movement; and update the first set of updated kinematics parameters to obtain a second set of updated kinematics parameters based on the second theoretical motion and a second actual motion due to the second movement of the robot, the second set of updated kinematics parameters being taken as calibrated kinematics parameters.

18. The kinematics calibration system of claim 14, wherein the robot comprises a redundant robot with seven degrees of freedom, six of which are locked by locking the base and locking the end effector to a first position.

19. The kinematics calibration system of claim 18, the control system is further configured to:

calculate a third theoretical motion of the end effector based on a third set of data associated with the joint angles due to a third null-space motion of the robot and the initial kinematics parameters, the third null-space motion of the robot is performed when the end effector has been moved to a second position different from the first position; and update the initial kinematics parameters to obtain a third set of updated kinematics parameters based on the third theoretical motion and a third actual motion due to the third null-space motion of the robot, and determining calibrated kinematics parameters based on the first set of updated kinematics parameters and the third set of updated kinematics parameters.

20. The kinematics calibration system of claim 14, wherein the control system is configured to update the initial kinematics parameters based on the first theoretical motion and a first actual motion by performing pair-wise distance measurements.

21. The kinematics calibration system of claim 14, wherein the base of the robot is locked while the end effector is allowed to move in a number of directions less than that of the multiple degrees of freedom, and wherein the end effector is configured to move in a fixed linear direction along a linear track, rotate about an axis of a bearing, move in a plane, or rotate about a center of the ball joint.

* * * * *